US010882659B2

(12) United States Patent
Benedetti

(10) Patent No.: US 10,882,659 B2
(45) Date of Patent: Jan. 5, 2021

(54) APPARATUS FOR FORMING A MONOLITHIC COMPRESSED WOOD PALLET WITH INCREASED LOAD CAPACITY

(71) Applicant: IMAL S.R.L., Modena (IT)

(72) Inventor: Paolo Benedetti, Modena (IT)

(73) Assignee: IMAL S.R.L., Modena (IT)

( * ) Notice: Subject to any disclaimer, the term of this patent is extended or adjusted under 35 U.S.C. 154(b) by 0 days.

(21) Appl. No.: 16/469,853

(22) PCT Filed: Dec. 21, 2017

(86) PCT No.: PCT/EP2017/084080
§ 371 (c)(1),
(2) Date: Jun. 14, 2019

(87) PCT Pub. No.: WO2018/115278
PCT Pub. Date: Jun. 28, 2018

(65) Prior Publication Data
US 2019/0367213 A1 Dec. 5, 2019

(30) Foreign Application Priority Data
Dec. 22, 2016 (IT) ........................ 102016000129741

(51) Int. Cl.
*B29C 67/00* (2017.01)
*B65D 19/00* (2006.01)
(Continued)

(52) U.S. Cl.
CPC ......... *B65D 19/0051* (2013.01); *B27N 1/029* (2013.01); *B27N 3/16* (2013.01);
(Continued)

(58) Field of Classification Search
CPC ................................. B27N 1/029; B27N 3/16
See application file for complete search history.

(56) References Cited

U.S. PATENT DOCUMENTS 4,248,163 A 2/1981 Caughey
5,740,898 A 4/1998 Pearson
(Continued)

FOREIGN PATENT DOCUMENTS

DE 2508493 A1 9/1976
DE 3222122 A1 8/1983
(Continued)

OTHER PUBLICATIONS

Anonymous: "Compressed wood pallet", Oct. 29, 2015, XP055408098.
(Continued)

*Primary Examiner* — Ryan M Ochylski
(74) *Attorney, Agent, or Firm* — Cantor Colburn LLP

(57) ABSTRACT

An apparatus for forming monolithic compressed wood pallets with increased load capacity includes a storage component having a chamber for collecting the mixture, inside which a first conveyor belt is accommodated for feeding a uniform layer of mixture toward an outlet. The first belt is wound around at least one motorized roller and entrained by it with a feed speed.

The apparatus also includes a pressing component with a lower mold part and an upper mold part between which a receptacle for forming a pallet is provided.

A second conveyor belt is interposed between the storage component and the pressing component. The apparatus further includes a component for modulating at least one among feed speed, the advancement speed, and the translation speed so as to obtain adjustment of quantity of mixture loaded/unloaded on/from upper portion of the second belt along an extension of the mat.

4 Claims, 10 Drawing Sheets

(51) Int. Cl.

| | |
|---|---|
| ***B27N 1/02*** | (2006.01) |
| ***B27N 3/16*** | (2006.01) |
| ***B27N 3/18*** | (2006.01) |
| ***B27N 3/22*** | (2006.01) |
| *B30B 15/30* | (2006.01) |

(52) U.S. Cl.
CPC ................. *B27N 3/18* (2013.01); *B27N 3/22* (2013.01); *B30B 15/302* (2013.01); *B65D 2519/00039* (2013.01); *B65D 2519/00074* (2013.01); *B65D 2519/0096* (2013.01); *B65D 2519/00268* (2013.01); *B65D 2519/00338* (2013.01)

(56) References Cited

U.S. PATENT DOCUMENTS

| | | | |
|---|---|---|---|
| 2007/0104818 | A1 | 5/2007 | Benedetti |
| 2007/0104821 | A1 | 5/2007 | Benedetti |

FOREIGN PATENT DOCUMENTS

| | | | |
|---|---|---|---|
| EP | 1436129 | A1 | 7/2004 |
| EP | 1987930 | A1 | 11/2008 |
| EP | 2653279 | A1 | 10/2013 |
| WO | 03022541 | A1 | 3/2003 |

OTHER PUBLICATIONS

Anonymous: "Standard Sizes Litco's Inca Presswood Pallets Domestic & Export Your Best Pallet for Domestic & Export Shipping Product Advantages", Jun. 8, 2016, pp. 1-2, XP055408088.

Anonymous: "VG Pack—Total Packaging Solutions", Dec. 7, 2013, XP055408097.

International Search Report dated May 11, 2018 re: Application No. PCT/EP2017/084080, pp. 1-7, citing: EP 1 987 930 A, US 2007/104821 A1, EP 2 653 279 A1, U.S. Pat. No. 5,740,898 A, EP 1 436 129 A1 and US 2007/104818 A1.

IT Search Report dated Sep. 27 2017 re: Application No. 2016000129741, pp. 1-13, citing: DE 32 22 122 A1, DE 25 08 493 A1, U.S. Pat. No. 4,248,163 A, Anonymous "VG Pack . . .", Anonymous "Standard Sizes . . ." and Anonymous "Compressed . . .".

Written Opinion dated May 11, 2018 re: Application No. PCT/EP2017/084080, pp. 1-11, citing: EP 1 987 930 A, US 2007/104821 A1, EP 2 653 279 A1, U.S. Pat. No. 5,740,898 A, EP 1 436 129 A1 and US 2007/104818 A1.

APPARATUS FOR FORMING A MONOLITHIC COMPRESSED WOOD PALLET WITH INCREASED LOAD CAPACITY

TECHNICAL FIELD

The present disclosure relates to an apparatus for forming a compressed wood pallet with increased load capacity.

BACKGROUND

Pallets for loading and transporting goods are known which are generally constituted by a loading surface below which multiple resting elements protrude.

In particular, monolithic compressed wood pallets are known which are obtained by forming a mixture of loose wood material mixed with adhesive materials, which generally have a loading surface below which multiple hollow resting feet protrude. The shape of these pallets is defined by a continuous layer of material having a substantially constant thickness and density.

The forming of these pallets provides for the loading of a female mold part, which reproduces the lower surface of the pallet, with said mixture, a step of adhesion of the loaded mixture at the non-horizontal walls of the recesses of the female mold part that correspond to the resting feet, and a step of hot pressing with a male mold part which reproduces the upper surface of the pallet.

These pallets are practical in use due to their light weight and due to the possibility to be mutually stacked when empty by inserting the feet of the overlying pallet in the corresponding recesses of the underlying pallet.

However, these monolithic compressed wood pallets of the known type are not free from drawbacks, which include the fact that they have a limited load capacity, which limits their possibility of use with very heavy goods and/or of stacking for storage on the ground or for use in automatic storage systems.

In the ceramics sector, for example, the tile packs are generally stored by mutually stacking them, and therefore the weight of the stacked packs is discharged onto the pallets of the underlying levels. Monolithic compressed wood pallets of the known type cannot be used in this sector indeed due to their limited load capacity.

Another limitation of these monolithic compressed wood pallets of the known type is linked to the complex production cycle, which requires performing various operating steps to form the hollow feet by using dedicated apparatuses.

SUMMARY

The aim of the present disclosure is to eliminate the drawbacks noted above of the background art by devising an apparatus for forming a monolithic compressed wood pallet with increased load capacity, which allows to obtain a system for loading the mixture of wood material in the pressing mold that is simple and automated for the provision of monolithic pallets with solid feet which have an increased load capacity, so as to expand their possibilities of use for very heavy goods or in sectors in which the storage of mutually stacked packs is used or in automatic storage systems.

Within this aim, the present disclosure allows the loading of a mixture of wood material into the mold so as to obtain, by pressing, pallets with regions having different density.

The present disclosure also provides a type of monolithic compressed wood pallet that allows to compact the space occupation of the stacked empty pallets so as to facilitate their transport and storage.

The present disclosure also simplifies the production cycle and to not require complex apparatuses for its execution.

The present disclosure further provides a pallet which can also be moved on roller conveyors or in automatic storage systems.

The present disclosure also has a structure that is simple, relatively easy to provide in practice, safe in use, effective in operation, and relatively modest in cost.

This aim and these and other advantages which will become better apparent hereinafter are all achieved by providing the present apparatus for forming a monolithic compressed wood pallet with increased load capacity, of the type that comprises a loading surface and at least two underlying resting stringers formed integrally in a monolithic body and is obtained by forming a mixture based on loose wood material and adhesive materials, comprising:

storage means comprising a chamber for the collection of said mixture inside which a first conveyor belt is accommodated for feeding a substantially uniform layer of said mixture toward an outlet, the first belt being wound around at least one first motorized roller and entrained by it with a feed speed;

pressing means, which are provided with a lower mold part and with an upper mold part between which a receptacle for forming a pallet is provided and which are alternately movable between a spaced loading configuration and a closer pressing configuration,

- a second conveyor belt interposed between said storage means and said pressing means, which is wound around at least one second motorized roller which drives it with an advancement speed and is associated with means for actuation with an alternating translational in a substantially horizontal direction with a translation speed, the upper portion of the second belt being substantially horizontal and translating with a transfer speed obtained from the combination of the advancement speed and of the translation speed, during loading the second belt being arranged below the outlet so as to obtain the deposition on the upper portion of a mat of said mixture and during unloading the second belt being interposed between said mold parts in a spaced configuration for the transfer of the mat within the lower mold part, characterized in that it comprises means for modulating at least one among said feed speed, said advancement speed and said translation speed so as to obtain an adjustment of the quantity of mixture loaded/unloaded on/from the upper portion of said second belt along the extension of said mat.

BRIEF DESCRIPTION OF THE DRAWINGS

Further characteristics and advantages of the present disclosure will become better apparent from the detailed description of two preferred but not exclusive embodiments of an apparatus for forming a monolithic compressed wood pallet with increased load capacity and of a pallet which can be thus obtained, illustrated by way of nonlimiting example in the accompanying drawings, wherein.

DETAILED DESCRIPTION OF THE DRAWINGS

Figure 1:
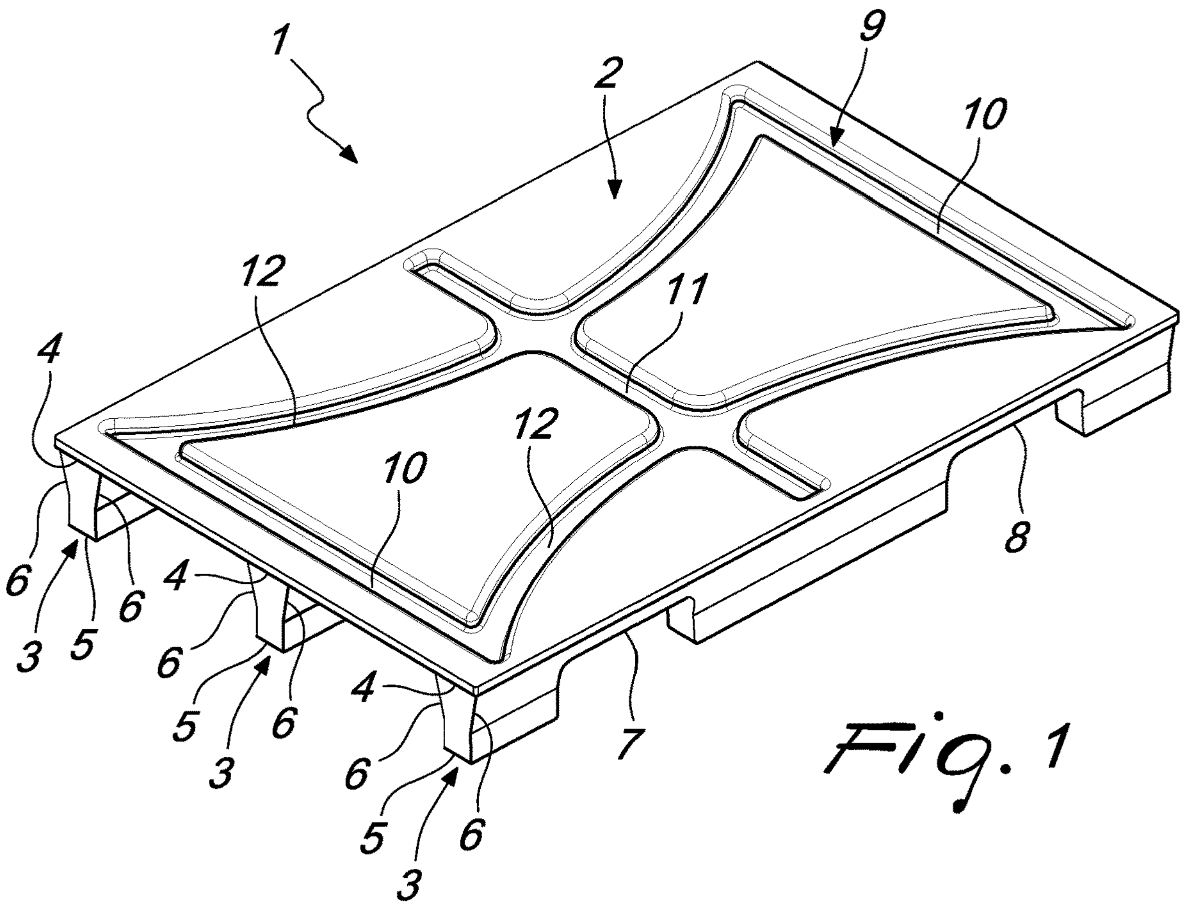
FIGS. 1 and 2 are respective axonometric views from above and from below of a monolithic compressed wood pallet with increased load capacity according to the disclosure.
Figure 2:
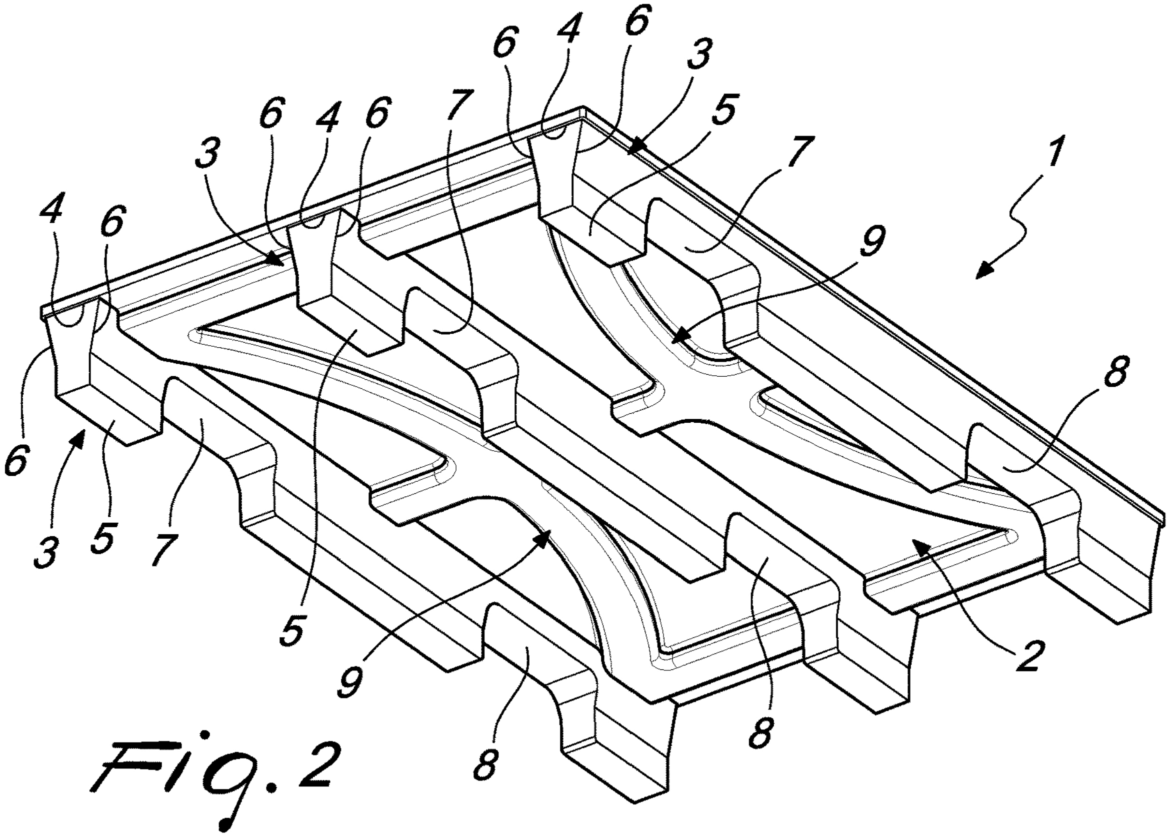
Figure 3:
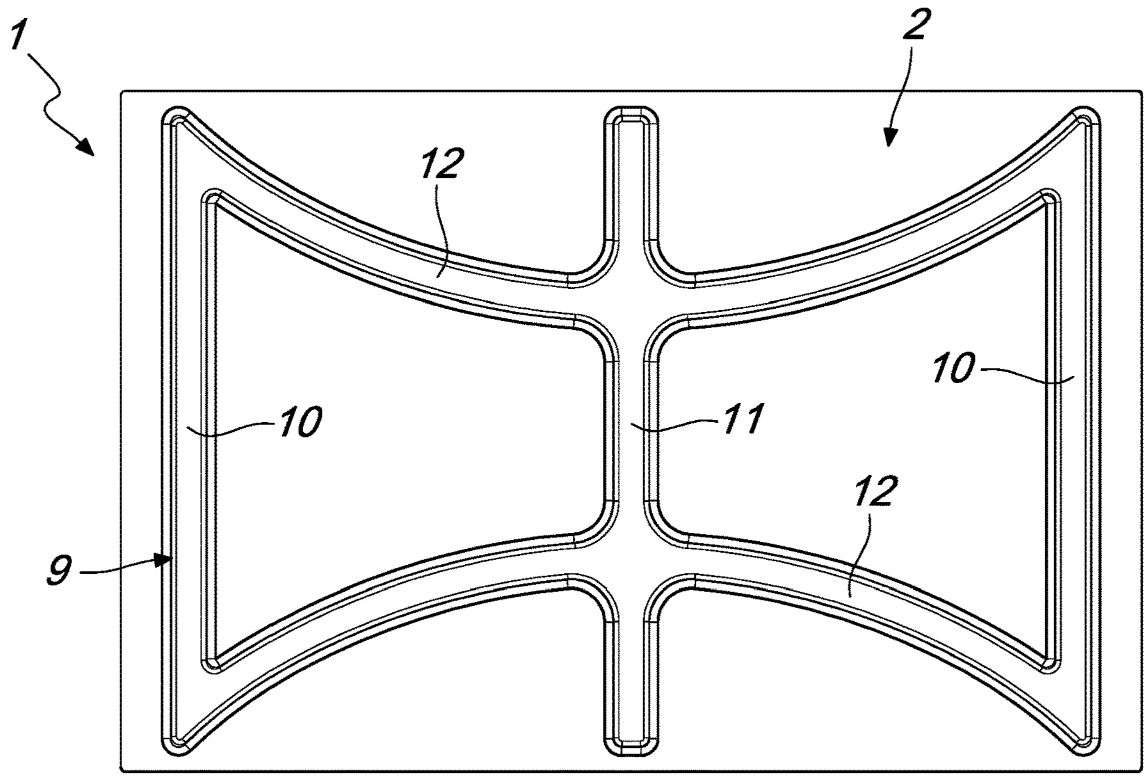
FIGS. 3 and 4 are respective top and bottom plan views of the pallet according to the disclosure.
Figure 4:
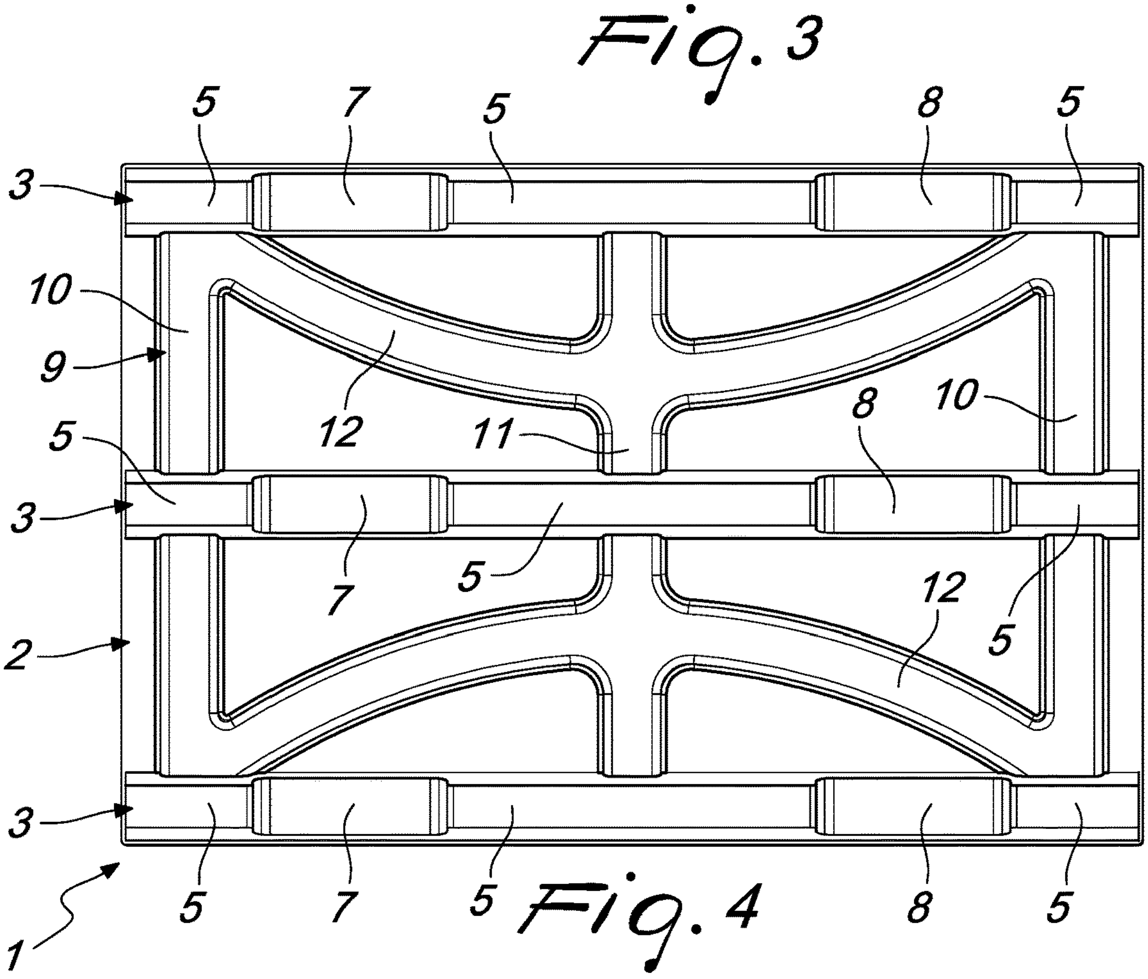
Figure 5:
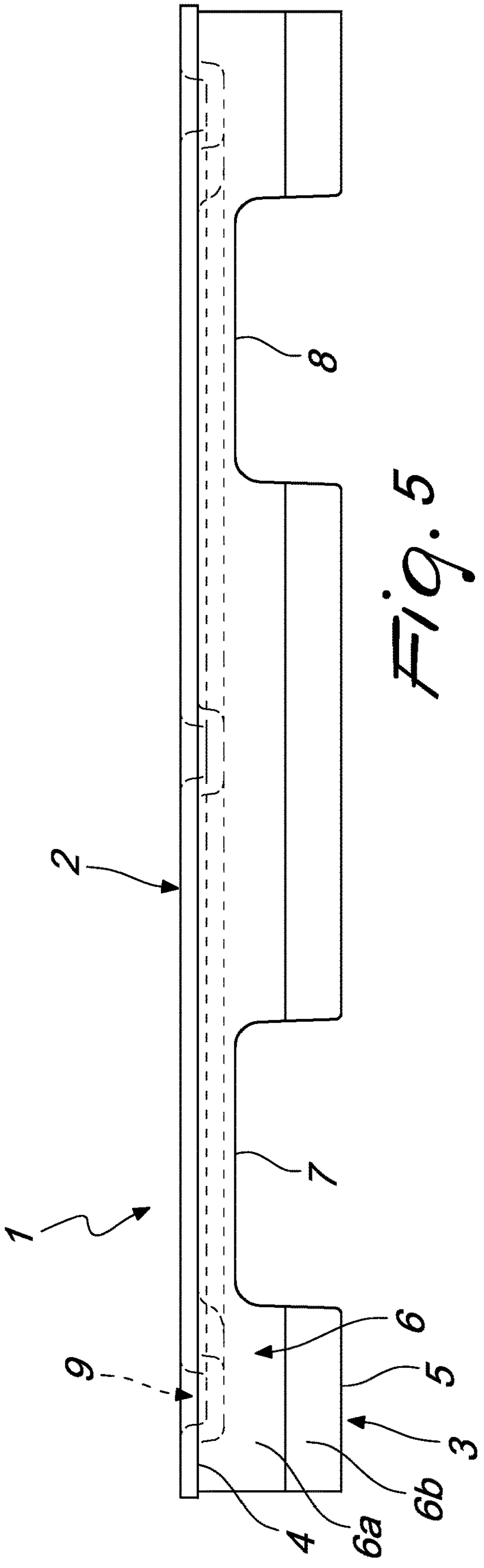
FIG. 5 is a front elevation view at a longer side of the pallet according to the disclosure.
Figure 6:
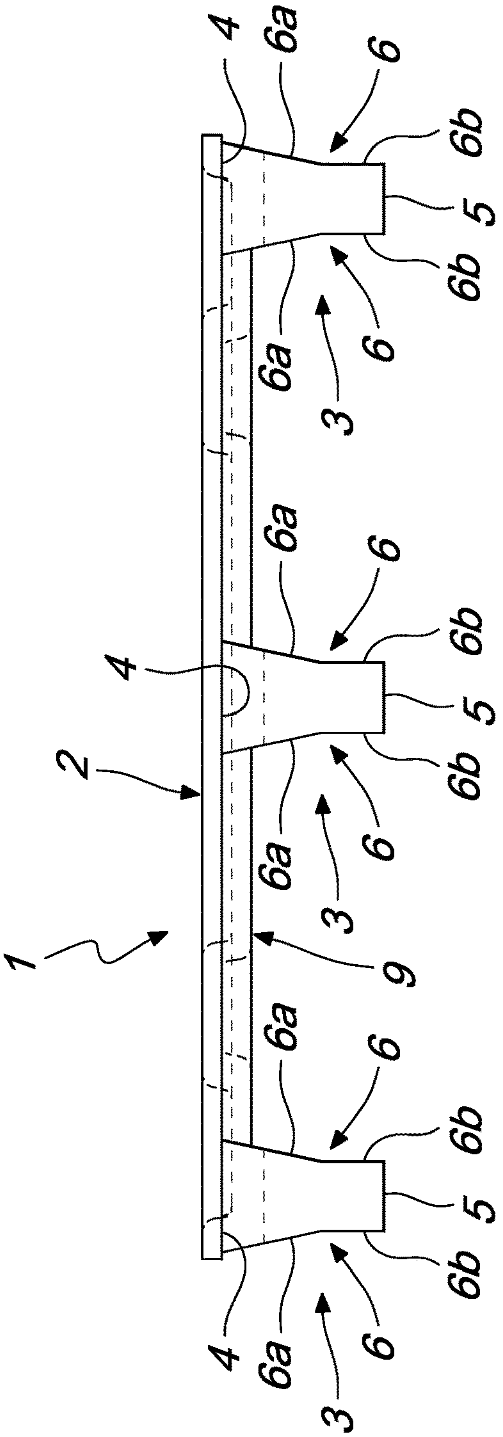
FIG. 6 is a front elevation view taken at a shorter side of the pallet according to the disclosure.

With particular reference to these FIGS. 1-13, the numeral 1 designates generally a monolithic compressed wood pallet with increased load capacity.

The pallet 1 is of the type that comprises a loading surface 2 and at least two underlying resting elements 3 which are mutually formed integrally in a monolithic body and is obtained by forming a mixture I based on loose wood material and adhesive materials.

The production of the pallet 1 occurs by hot pressing of the mixture I loaded into an adapted mold and the adhesive materials are of the thermosetting type. The loose wood material is typically of the type of wood chips or shavings.

Each one of the resting elements 3 is constituted by a respective stringer that has a linear extension. The term "stringer" is understood to designate a continuous element that has a longitudinal extension that is substantially greater than the dimensions of the corresponding transverse cross-section and is made of solid material.

Furthermore, the pallet 1 is provided with regions having different densities of material, i.e., it has a nonuniform density in its three-dimensional extension.

In one preferred embodiment, the pallet 1 can have a higher density of material at the stringers 3 with respect to the loading surface 2. For example, the density of the stringers 3 can be up to twice the density of the loading surface 2.

In this manner it is possible to increase the load capacity of the pallet 1, allowing its use also to provide packs of heavy materials or mutual stacking once loaded.

However, alternative embodiments are not excluded in which the pallet 1 has, for example, a different distribution of the density of the material that constitutes it over the extension of the loading surface 2, i.e., has a density of the stringers 3 that is up to half that of the loading surface 2.

The transverse cross-section of each stringer 3 is provided with a side 4 for coupling to the loading surface 2 and with a resting base 5, which are mutually opposite. Preferably, the coupling side 4 has a linear extension that is greater than the resting surface 5 so as to render the pallet 1 stronger, avoiding the separation of the stringers 3 from the loading surface 2 in case of lateral impact, and at the same time so as to limit the quantity of material used, with a consequent reduction of the weight of said pallet and of the corresponding production cost.

In this case, the transverse cross-section of each stringer 3 is provided with a pair of mutually opposite side walls 6, which connect the coupling side 4 and the resting base 5 and have a first portion 6*a*, adjacent to the coupling side 4, and a second portion 6*b*, which is adjacent to the resting base 5. Preferably, the first portions 6*a* converge in the direction away from the coupling side 4 and the second portions 6*b* are mutually substantially parallel. This shape of the transverse cross-section of the stringers 3 allows easy stacking of the unloaded pallets 1, so to contain their space occupation for transport and storage.

Figure 7:
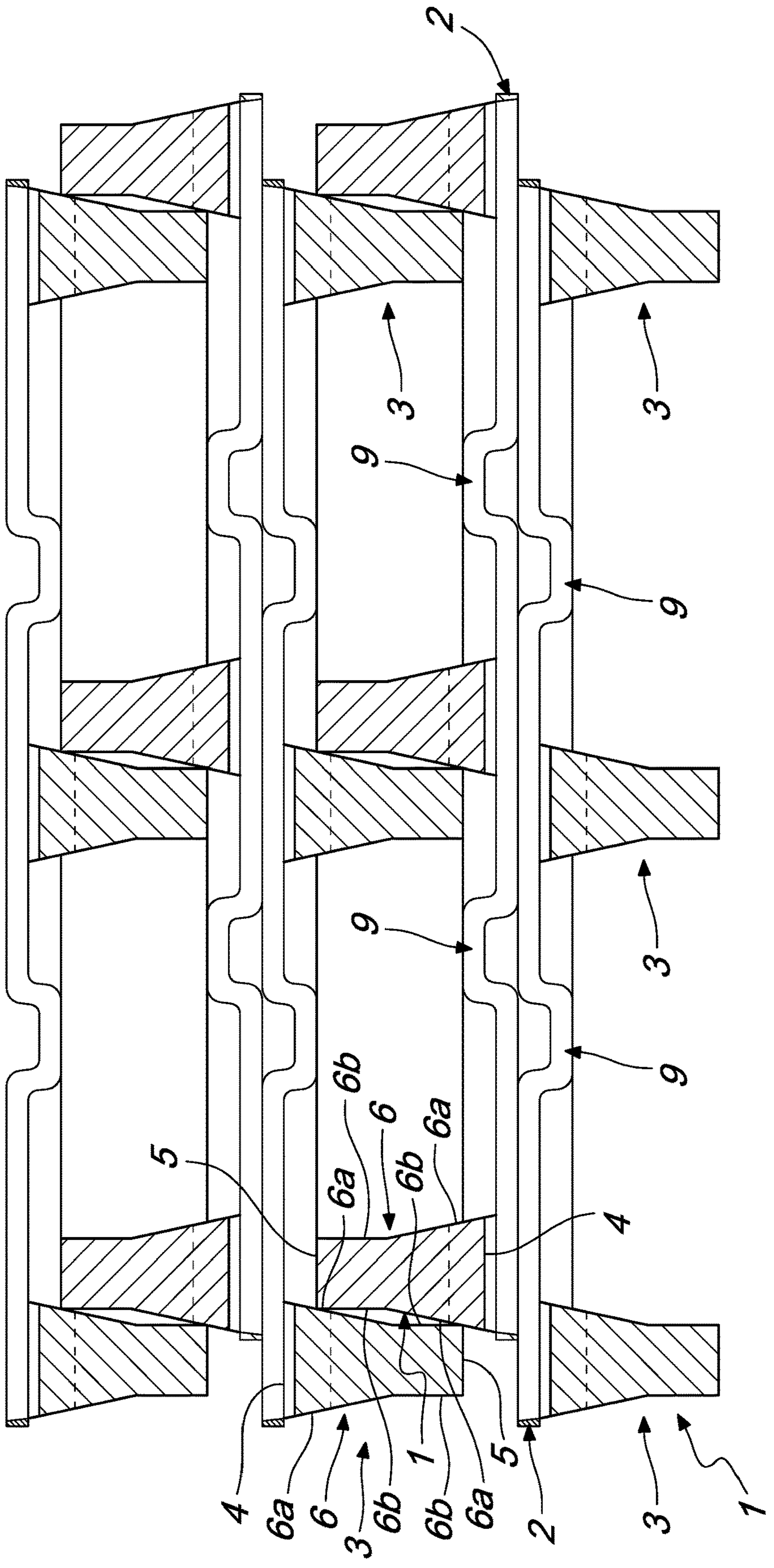
FIG. 7 is a partially sectional view of a plurality of pallets according to the disclosure, stacked on each other.
Figure 8:
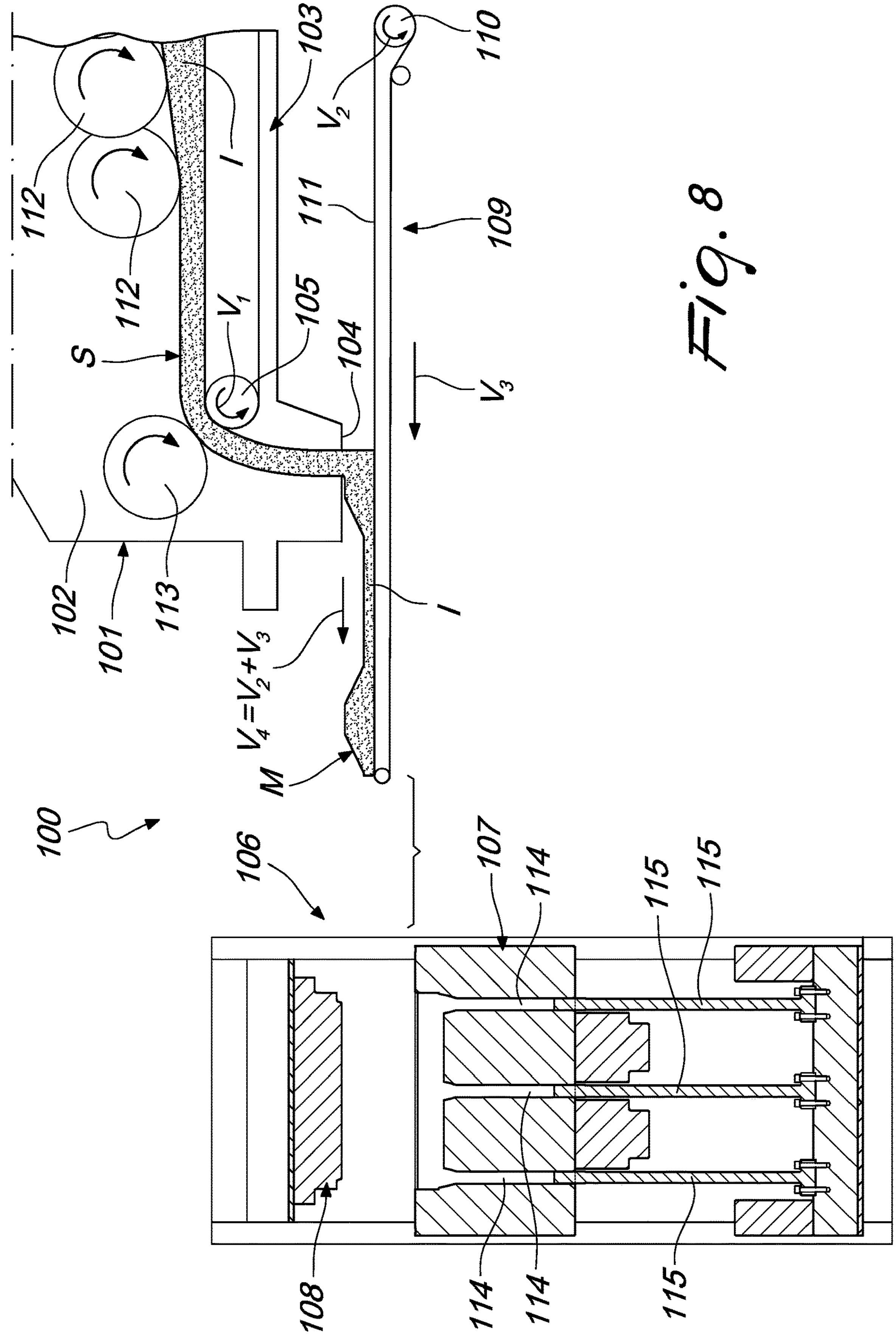
FIGS. 8, 9 and 10 are partially sectional views of a first embodiment of a forming apparatus according to the disclosure, respectively during loading and in two subsequent unloading operating steps.

With reference to FIG. 7, it is in fact possible to note that the pallets 1 can be stacked arranged in pairs, the upper one turned over with the corresponding loading surface 2 resting on the loading surface 2 of the lower one and slightly staggered in a horizontal direction. The stringers 3 that are directed upward of the upper pallet 1 of each pair are juxtaposed with the stringers 3 of the lower pallet 1 of the overlying pair, with the corresponding side walls 6 in contact (the first portion 6*a* of a side wall 6 of each stringer 3 of the upper pallet 1 of the underlying pair in contact with the edge between the resting base 5 and the second portion 6*b* of a side wall 6 of each stringer 3 of the lower pallet 1 of the overlying pair and vice versa).

However, it is not excluded that the coupling side 4 and the resting base 5 may have substantially the same linear extension and the side walls 6 therefore can have a rectilinear extension so as to form a substantially rectangular transverse cross-section of each stringer 3.

Generally, the loading surface 2 has the shape of a parallelogram in plan view, i.e., the shape of a quadrilateral with two pairs of identical and parallel sides. The figures show a pallet 1 which has a loading surface 2 having a rectangular shape in plan view, but it is not excluded that it might have for example a square shape in plan view.

The stringers 3 are therefore extended parallel to a first pair of parallel sides of the loading surface 2 and preferably have a longitudinal extension that is substantially equal to said sides.

Furthermore, the pallet 1 can have three stringers 3, of which two are arranged proximate to the first pair of parallel sides and one is arranged at the centerline of the loading surface 2, in order to better support the overlying weight and avoid deformations of said surface.

The number of stringers 3 can vary as a function of the extension of the loading surface 2 and of the load that the pallet 1 must bear.

Usefully, each stringer 3 has, along its own longitudinal extension, a first recess 7 and a second recess 8 which are open downward, the first and second recesses 7 and 8 of the stringers 3 being mutually aligned so as to form respective channels for the insertion of loading forks for the handling of the pallet 1 by means of conventional conveyance apparatuses provided with lifting forks.

Depending on the intended use of the pallet 1, the size and height of the stringers 3 and/or the size and arrangement of the recesses 7 and 8 may vary. It is not excluded that said recesses might not be present and that the stringers 3 might have a uniform height along their linear extension; in this case, the lifting forks of conventional conveyance apparatuses can be inserted parallel to the stringers 3 in the spaces provided between them.

Finally, the pallet 1 is provided with stiffening ribs 9 which are formed integrally with the loading surface 2.

More precisely, the ribs 9 are formed by slots which are recessed in the upper face of the loading surface 2 and protrude from the lower face of said surface, the loading surface 2 having a substantially constant thickness over its extension.

In a lower region, the ribs 9 determine the resting surface for the stacking of the pallets 1, since the ribs 9 of the lower pallet 1 of the overlying pair rest on the resting bases 5 of the stringers 3 that are directed upward of the upper pallet 1 of the underlying pair and vice versa (FIG. 7).

In the embodiment shown, the ribs 9 have two first rectilinear portions 10 proximate to the second pair of parallel sides of the loading surface 2, a second rectilinear portion 11, which is parallel to the preceding ones and is arranged at the centerline of said surface, and two third arc-like portions 12, with the concavities directed toward the outside of the loading surface 2, which connect the ends of the first portions 10 and intersect the second portion 11.

However, alternative geometries and/or distributions of the ribs 9 are not excluded which are in any case suitable to increase the rigidity of the loading surface 2.

In order to form the pallet 1 described above, an apparatus 100 is advantageously used which comprises:

- storage means 101, which comprise a chamber 102 for collecting the mixture I, inside which a first conveyor belt 103 is accommodated for feeding a substantially uniform layer S of mixture I toward an outlet 104, the first belt 103 being wound around at least one first motorized roller 105 and being moved by it with a feed speed (indicated by the arrow $V_1$ in the figures);
- pressing means 106 provided with a lower mold part 107 and with an upper mold part 108, between which a receptacle for forming a pallet 1 is formed, which can move alternately between a spaced loading configuration and a mutually closer pressing configuration,
- a second conveyor belt 109, which is interposed between the storage means 101 and the pressing means 106, which is wound around at least one second motorized roller 110 which entrains it with an advancement speed (indicated by the arrow $V_2$ in the figures) and is associated with means for alternating translational actuation in a substantially horizontal direction with a translation speed (indicated by the arrow $V_3$ in the figures).

The upper portion 111 of the second belt 109 is arranged substantially horizontally and translates with a transfer speed (indicated by the arrow $V_4$ in the figures) that is obtained from the combination of the advancement speed $V_2$ and of the translation speed $V_3$.

In the loading step (FIGS. 8 and 11), the second belt 109 is arranged below the outlet 104 so as to obtain the deposition on the upper portion 111 of a mat M of mixture I and during the unloading step (FIGS. 9-10, 12-13) the second belt 109 is interposed between the mold parts 107 and 108 in a spaced configuration for the transfer of the mat M into the lower mold part 107.

The apparatus further 100 comprises means for modulation of at least one among the feed speed $V_1$, the advancement speed $V_2$ and the translation speed $V_3$ so as to obtain an adjustment of the quantity of mixture I loaded/unloaded on/from the upper portion 111 of the second belt 109 along the extension of the mat M in a direction that is parallel to the arrangement of said second belt.

The storage means 101 are of the type of a conventional bunker, inside which a mass of mixture I is discharged which a plurality of rollers 112 levels into the shape of a layer S on the first belt 103 and an end roller 113 conveys toward the outlet 104.

The pressing means 106 include a conventional press. According to a known technology, the lower mold part 107 is provided with deeper regions, into which a larger quantity of mixture I is therefore unloaded, at the portions of the pallet 1 in which a higher density is to be obtained.

The pressing means 106 preferably have a simultaneous actuation for mutual approach/spacing of the lower mold parts 107 and 108. The pressure to be applied is determined as a function of the thickness of the mixture I that is loaded into the lower mold part 107 and of the thickness and final density of the article that one wishes to obtain. In the illustrated embodiments, for example, the lower mold part 107 is provided with three recesses 114 which correspond to the three stringers 3 of the pallet 1 to be formed, along which, during pressing, corresponding punches 115 supported by a cross-member slide.

The means for translational actuation of the second belt 109, not shown, can be constituted by conventional linear actuators.

Preferably, the modulation means are adapted to manage all three of the feed speed $V_1$, the advancement speed $V_2$ and the translation speed $V_3$.

Advantageously, the first roller 105, the second roller 110 and the translation means comprise respective electric motors, not shown, and the modulation means, also not shown, comprise electronic means for the adjustment and control of said electric motors, of the type of conventional inverters, which are associated with an electronic processing unit, such as a programmed or programmable electronic board with a working cycle that is defined on the basis of the geometry of the pallet 1 to be provided.

In a first embodiment (FIGS. 8-10), the modulation means are adapted to reduce the transfer speed $V_4$ and/or increase the feed speed $V_1$ during loading of the second belt 109 (FIG. 8) so as to obtain a "preformed" mat M, i.e., having sections of greater thickness that correspond to the portions of the pallet 1 with higher density, and to maintain the transfer speed $V_4$ substantially constant during the unloading of said second belt (FIGS. 9-10), with the first belt 103 stationary.

The figures, for example, show a mat M which has three sections of greater thickness which correspond to the three stringers of the pallet 1 to be obtained, which are designed to be unloaded into the three recesses 114 of the lower mold part 107.

Figure 9:
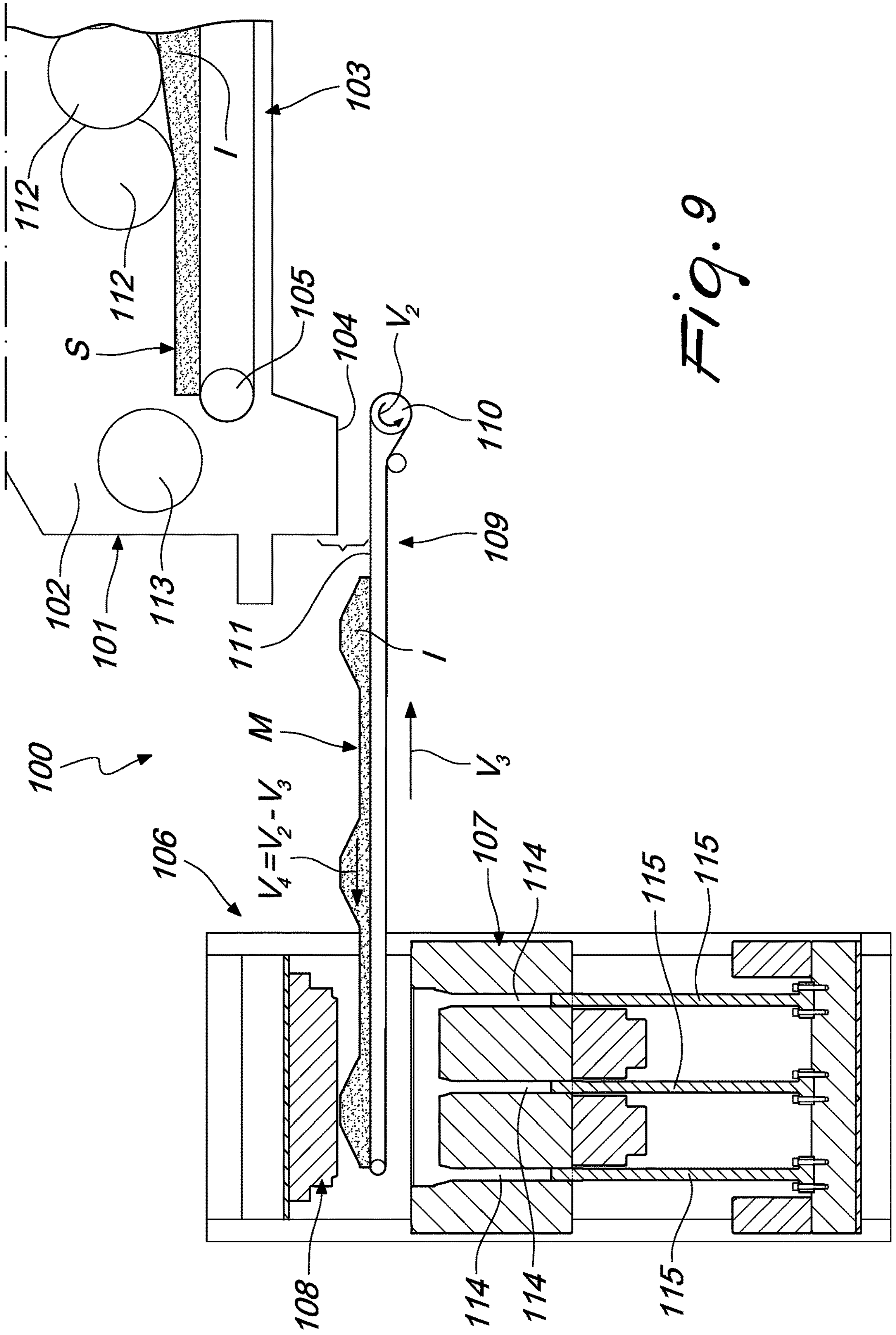
Figure 10:
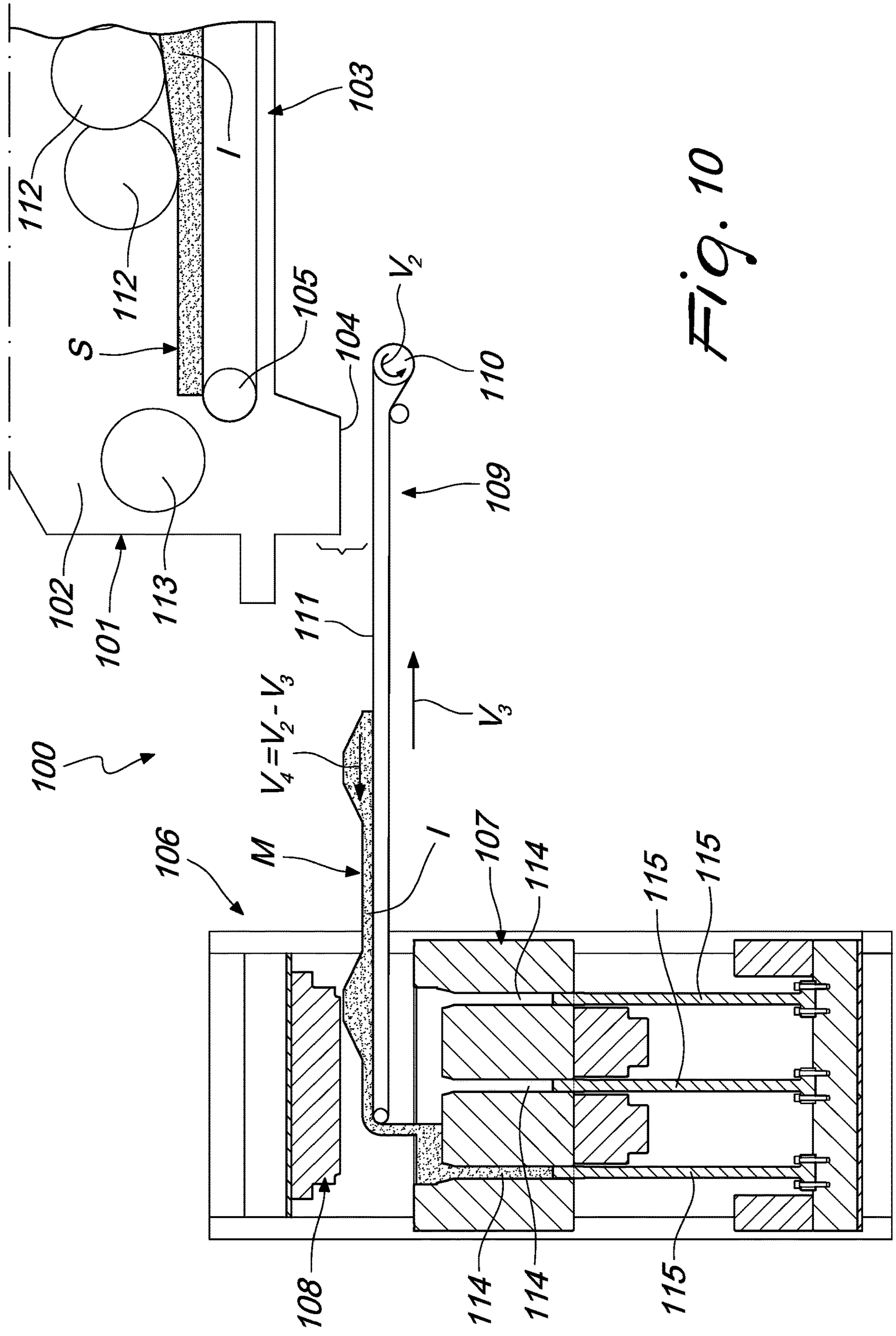
Figure 11:
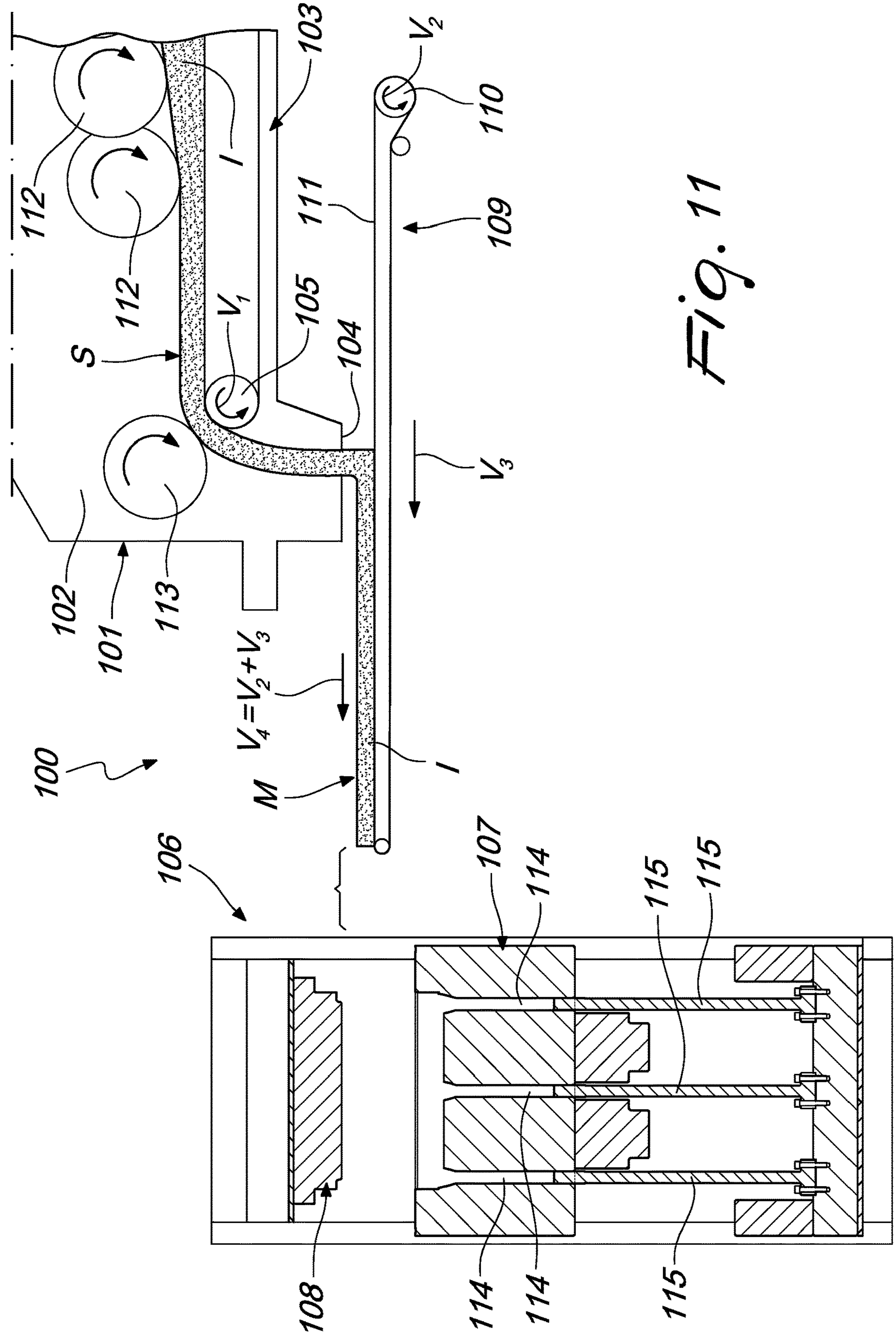
FIGS. 11, 12 and 13 are partially sectional views of a second embodiment of a forming apparatus according to the disclosure, respectively during loading and in two subsequent unloading operating steps.

FIG. 9 shows the second belt 109 fully inserted between the mold parts 107 and 108 at the beginning of the unloading step; FIG. 10 shows a subsequent operating step of unloading with the second belt 109 that moves away from the mold parts 107 and 108 while it unloads the mat M into the lower mold part 107.

The adjustment of the transfer speed $V_4$ can be performed by acting on one or both of the advancement speed $V_2$ and the translation speed $V_3$.

In an alternative embodiment of the apparatus 100 (FIGS. 11-13), the modulation means are adapted to keep substantially constant the feed speed $V_1$ and the transfer speed $V_4$ during loading (FIG. 10) of the second belt 109 so as to obtain a mat M that has a substantially constant thickness and to increase the advancement speed $V_2$ and/or reduce the translation speed $V_3$ during the unloading of said second belt (FIGS. 12-13), with the first belt stationary, in order to obtain the unloading of larger quantities of mixture I at the sections of the lower mold part 107 that correspond to the portions of pallet 1 that have a higher density.

With reference to the figures, for example, the modulation means can increase the advancement speed $V_2$ and/or decrease the translation speed $V_3$ at the recesses 114 of the lower mold part 107 in order to obtain their filling.

Figure 12:
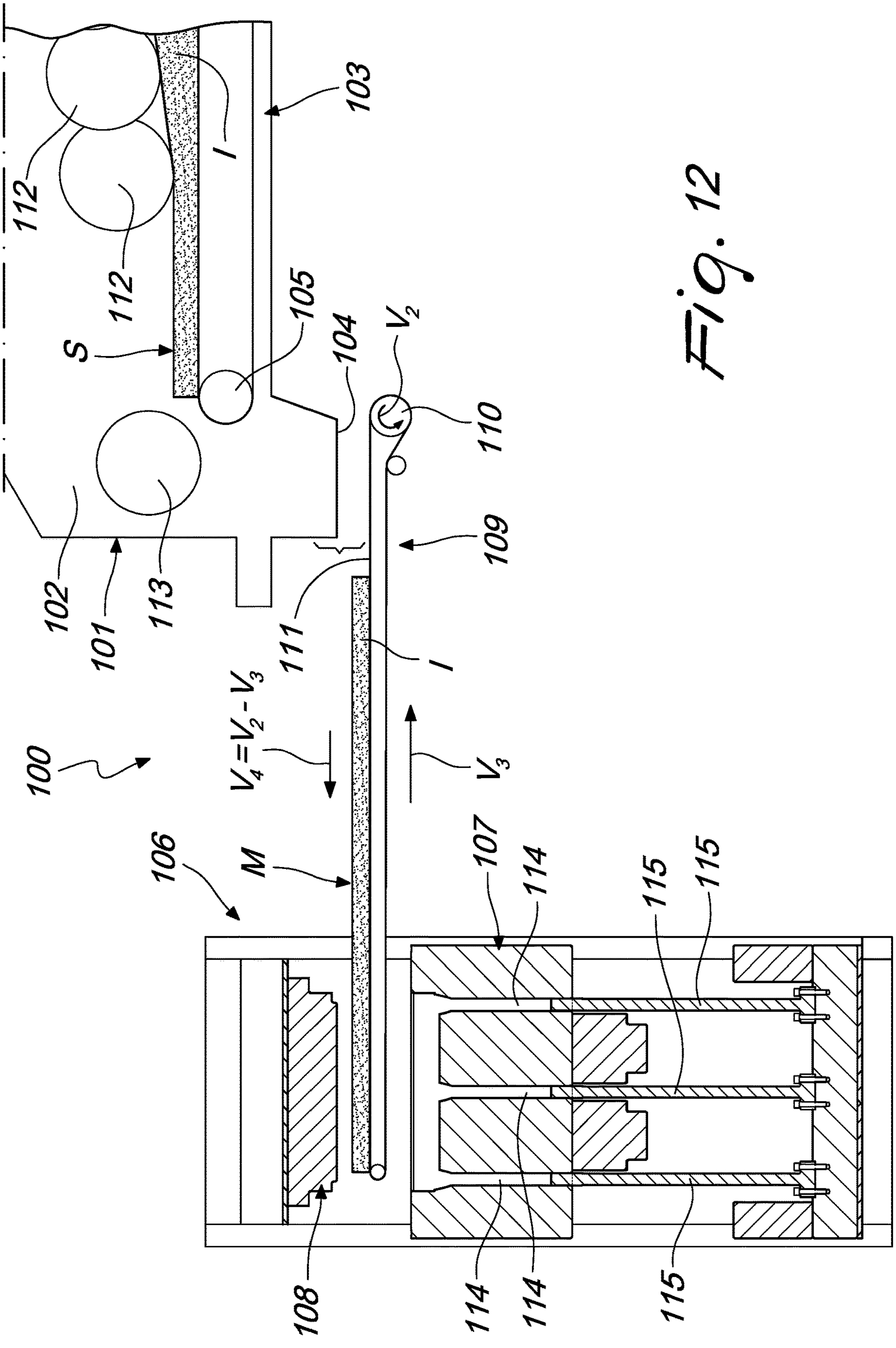
Figure 13:
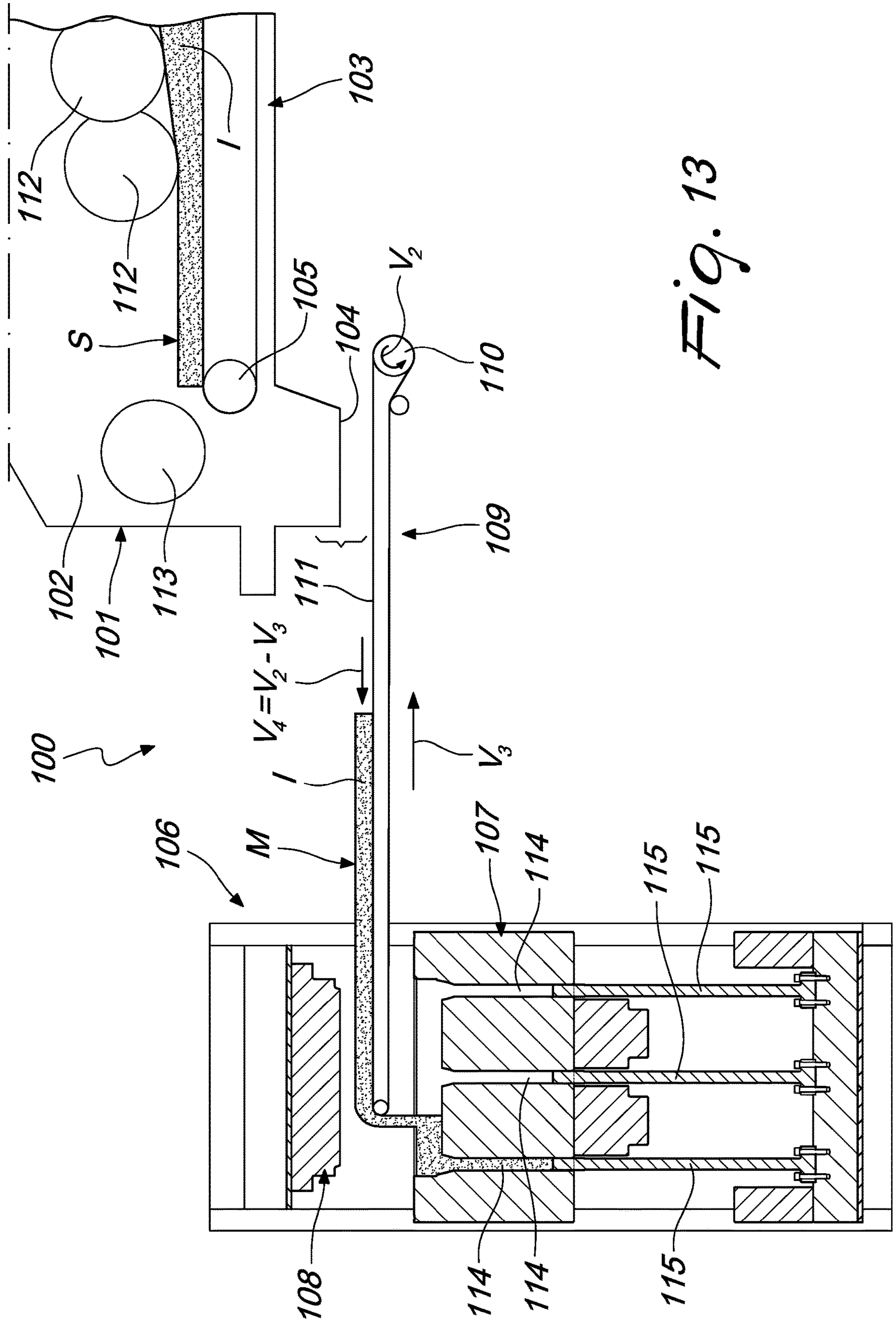

FIG. 12 shows the second belt 109 fully inserted between the mold parts 107 and 108 at the beginning of the unloading step; FIG. 13 shows a subsequent operating step of unloading, with the second belt 109 moving away from the mold parts 107 and 108 while it unloads the mat M into the lower mold part 107.

In practice it has been found that the described disclosure achieves the proposed aims and advantages and in particular the fact is stressed that the forming apparatus according to the disclosure allows to obtain, by means of a simple and automated process, the loading of molds to obtain monolithic compressed wood pallets with solid supporting elements.

Furthermore, the pallet according to the disclosure allows to maintain the light weight characteristics that are typical of compressed wood pallet with hollow feet, increasing however the load capacity in order to obtain a performance that is equivalent to that of pallets made of wood boards.

Furthermore, the stringer-like shape of the resting elements allows to handle the pallets according to the disclosure on roller conveyors or to use them in automatic storage systems.

Moreover, the forming apparatus according to the disclosure is constructively simple and the pressing cycle can occur in a single step according to known technologies.

The disclosure thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to the requirements without thereby abandoning the protective scope of the claims that follow.

The disclosures in Italian Patent Application No. 102016000129741 (UA2016A009329) from which this application claims priority are incorporated herein by reference.

The invention claimed is:

1. An apparatus for forming monolithic compressed wood pallets with increased load capacity, the apparatus comprises a loading surface and at least two underlying resting stringers formed integrally in a monolithic body that is obtained by forming a mixture based on loose wood material and adhesive materials, comprising:

a storage component comprising a chamber for the collection of said mixture inside which a first conveyor belt is accommodated for feeding a substantially uniform layer of said mixture toward an outlet, the first belt being wound around at least one first motorized roller and entrained by it with a feed speed;

a pressing component comprising a lower mold part and an upper mold part between which a receptacle for forming a pallet is provided and which are alternately movable between a spaced loading configuration and a closer pressing configuration;

a second conveyor belt interposed between said storage component and said pressing component, which is wound around at least one second motorized roller which drives it with an advancement speed and is associated with an actuation component having an alternating translational motion in a substantially horizontal direction with a translation speed, the upper portion of the second belt being substantially horizontal and translating with a transfer speed obtained from the combination of the advancement speed and of the translation speed, during loading, the second conveyor belt is arranged below the outlet so as to obtain the deposition on the upper portion of a mat of said mixture and during unloading the second conveyor belt is interposed between said mold parts in a spaced configuration for the transfer of the mat within the lower mold part, and comprising a modulation component configured for varying at least one among said feed speed, said advancement speed, and said translation speed so as to obtain an adjustment of the quantity of mixture loaded/unloaded on/from the upper portion of said second belt along the extension of said mat.

2. The apparatus according to claim 1, wherein a translation component is configured for actuation with an alternating translational motion, said first motorized roller and said second motorized roller, each comprise an electric motor and in that said modulation component comprises an inverter and an electronic processing unit configured for adjustment and control of said electric motors.

3. The apparatus according to claim 1, wherein said modulation component is adapted to reduce said transfer speed and/or increase said feed speed during loading so as to obtain a mat of said mixture having thicker cross-sections that correspond to the portions of the pallet that have a higher density and so as to maintain said transfer speed substantially constant during the unloading of said belt.

4. The apparatus according to claim 1, wherein said modulation component is adapted to maintain said feed speed and said transfer speed substantially constant during the loading of said second belt, so as to obtain a mat of said mixture that has a substantially constant thickness and so as to increase said advancement speed and/or decrease said translation speed during the unloading of said second belt for the discharge of greater quantities of mixture at the sections of said lower mold part that correspond to the portions of the pallet that have a higher density.

* * * * *